(12) United States Patent
Nomoto et al.

(10) Patent No.: US 11,585,696 B2
(45) Date of Patent: Feb. 21, 2023

(54) OPTICAL PROPERTY EVALUATION APPARATUS AND OPTICAL PROPERTY EVALUATION METHOD

(71) Applicants: HAMAMATSU PHOTONICS K.K., Hamamatsu (JP); The University of Tokyo, Tokyo (JP)

(72) Inventors: Yoshiro Nomoto, Hamamatsu (JP); Takuo Tanemura, Tokyo (JP)

(73) Assignees: HAMAMATSU PHOTONICS K.K., Hamamatsu (JP); The University of Tokyo, Tokyo (JP)

(*) Notice: Subject to any disclaimer, the term of this patent is extended or adjusted under 35 U.S.C. 154(b) by 0 days.

(21) Appl. No.: 17/495,995

(22) Filed: Oct. 7, 2021

(65) Prior Publication Data

US 2022/0120612 A1   Apr. 21, 2022

(30) Foreign Application Priority Data

Oct. 19, 2020   (JP) .............................. JP2020-175379

(51) Int. Cl.
   *G01J 3/02*   (2006.01)
   *G01N 21/21*  (2006.01)
   *G01J 3/447*  (2006.01)
   *G02B 27/28*  (2006.01)

(52) U.S. Cl.
   CPC ........... *G01J 3/0224* (2013.01); *G01J 3/0218* (2013.01); *G01J 3/447* (2013.01); *G01N 21/211* (2013.01); *G01N 2021/213* (2013.01); *G02B 27/283* (2013.01)

(58) Field of Classification Search
   None
   See application file for complete search history.

(56) References Cited

U.S. PATENT DOCUMENTS

4,298,283 A * 11/1981 Makosch ........... G01B 11/0608
                                                         356/516
2019/0137776 A1 * 5/2019 Ryu .................. G01B 11/0641

OTHER PUBLICATIONS

Horie, Yu. Controlling the Flow of Light Using High-Contrast Metastructures. Diss. California Institute of Technology, 2018. (Year: 2018).*

(Continued)

*Primary Examiner* — Tarifur R Chowdhury
*Assistant Examiner* — Roberto Fabian, Jr.
(74) *Attorney, Agent, or Firm* — Faegre Drinker Biddle & Reath LLP (57) ABSTRACT

An optical property evaluation apparatus evaluates an optical property of an evaluation object, and includes a light source, a polarization beam splitter, a polarization adjuster, a first detector, a second detector, and an analyzer. The analyzer obtains a reflectance when linearly polarized light in a specific direction is incident on the evaluation object based on the detection result by the first detector when the light with which the evaluation object is irradiated is set to be the linearly polarized light in the specific direction. The analyzer obtains a phase property at the reflection of the evaluation object based on the detection result by the first detector or the second detector when the light with which the evaluation object is irradiated is set to have a polarization state different from the linearly polarized light in the specific direction, and a Jones matrix.

20 Claims, 7 Drawing Sheets

(56) References Cited

OTHER PUBLICATIONS

Horie, Yu, "Controlling the Flow of Light Using High-Contrast Metastructures," California Institute of Technology, Doctoral Thesis, 2017, 123 pages.

* cited by examiner

OPTICAL PROPERTY EVALUATION APPARATUS AND OPTICAL PROPERTY EVALUATION METHOD

TECHNICAL FIELD

The present disclosure relates to an optical property evaluation apparatus and an optical property evaluation method.

BACKGROUND

With recent developments of microfabrication techniques using semiconductor manufacturing apparatuses, it has become possible to fabricate structures having microstructures smaller than wavelengths. By using the microstructure, an artificial material having a specific optical property that does not exist in nature (this may be referred to as a metamaterial or a metasurface) can be produced, and a device utilizing the specific optical property of the artificial material can be produced.

The above techniques have been actively studied and put into practical use. Further, a device can be realized by incorporating a very thin metal into the microstructure and utilizing a plasmon effect to obtain the specific optical property, and many such devices have been reported.

Many of these specific artificial materials have optical anisotropy due to their structure. Due in part to the very small size of the artificial material, the apparatus for evaluating the optical property of the artificial material is complicated and expensive. As the anisotropic material, in addition to such a specific artificial material, a liquid crystal, a nonlinear optical material, and the like are also known.

A spectroscopic ellipsometer is known as an apparatus for evaluating an optical property of an object having optical anisotropy. Since this apparatus utilizes the difference in reflectance of the evaluation object between s-polarized light and p-polarized light, it is necessary to perform measurement with oblique incidence in which the ratio of these is large, and as a result, the optical paths of incident light and reflected light are different from each other, and the apparatus becomes large-scale. When the evaluation object is very small, a complicated optical system is required.

In the technique described in Non Patent Document 1, light can be vertically incident on the evaluation object, and thus, it is preferable to the spectroscopic ellipsometer in this respect. The technique described in Non Patent Document 1 uses a polarizer and a half wave plate for obtaining a reflectance of the evaluation object, and uses a quarter wave plate and a half wave plate for obtaining a phase property at the reflection of the evaluation object.

Non Patent Document 1: Yu Horie, "Controlling the Flow of Light Using High-Contrast Metastructures", California Institute of Technology, Doctoral Thesis, 2017

SUMMARY

In the technique described in Non Patent Document 1, since it is necessary to replace the optical element inserted into an optical path in the reflectance measurement and the phase property measurement for the evaluation object, replacement of the optical element and adjustment of the optical system take time, and the measurement is not easy.

An object of an embodiment is to provide an apparatus and a method that can easily evaluate an optical property of an evaluation object by a simple configuration.

An embodiment is an optical property evaluation apparatus. The optical property evaluation apparatus includes (1) a light source configured to output light; (2) a polarization beam splitter configured to separate the light output from the light source into a linearly polarized component in a first direction and a linearly polarized component in a second direction; (3) a polarization adjuster provided on an optical path between the polarization beam splitter and an evaluation object, and configured to adjust a polarization state of the light output from the polarization beam splitter as the linearly polarized component in the first direction, irradiate the evaluation object with the adjusted light, adjust a polarization state of reflected light generated by the light irradiation on the evaluation object, and output the adjusted light to the polarization beam splitter; (4) a first detector configured to receive and detect the linearly polarized component in the first direction being separated and output by the polarization beam splitter from the light reaching the polarization beam splitter from the evaluation object through the polarization adjuster; (5) a second detector configured to receive and detect the linearly polarized component in the second direction being separated and output by the polarization beam splitter from the light reaching the polarization beam splitter from the evaluation object through the polarization adjuster; and (6) an analyzer configured to analyze a reflectance and a phase property of the evaluation object based on the detection result by the first detector or the second detector.

An embodiment is an optical property evaluation method. The optical property evaluation method includes (1) separating, by a polarization beam splitter, light output from a light source into a linearly polarized component in a first direction and a linearly polarized component in a second direction; (2) adjusting, by a polarization adjuster provided on an optical path between the polarization beam splitter and an evaluation object, a polarization state of the light output from the polarization beam splitter as the linearly polarized component in the first direction, irradiating the evaluation object with the adjusted light, adjusting a polarization state of reflected light generated by the light irradiation on the evaluation object, and outputting the adjusted light to the polarization beam splitter; (3) receiving and detecting, by a first detector, the linearly polarized component in the first direction being separated and output by the polarization beam splitter from the light reaching the polarization beam splitter from the evaluation object through the polarization adjuster; (4) receiving and detecting, by a second detector, the linearly polarized component in the second direction being separated and output by the polarization beam splitter from the light reaching the polarization beam splitter from the evaluation object through the polarization adjuster; and (5) analyzing a reflectance and a phase property of the evaluation object based on the detection result by the first detector or the second detector.

According to the optical property evaluation apparatus and the optical property evaluation method of the embodiments, an optical property of an evaluation object can be easily evaluated by a simple configuration.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION

Hereinafter, embodiments of an optical property evaluation apparatus and an optical property evaluation method will be described in detail with reference to the accompanying drawings. In the description of the drawings, the same elements will be denoted by the same reference signs, and redundant description will be omitted. The present invention is not limited to these examples.

Figure 1:
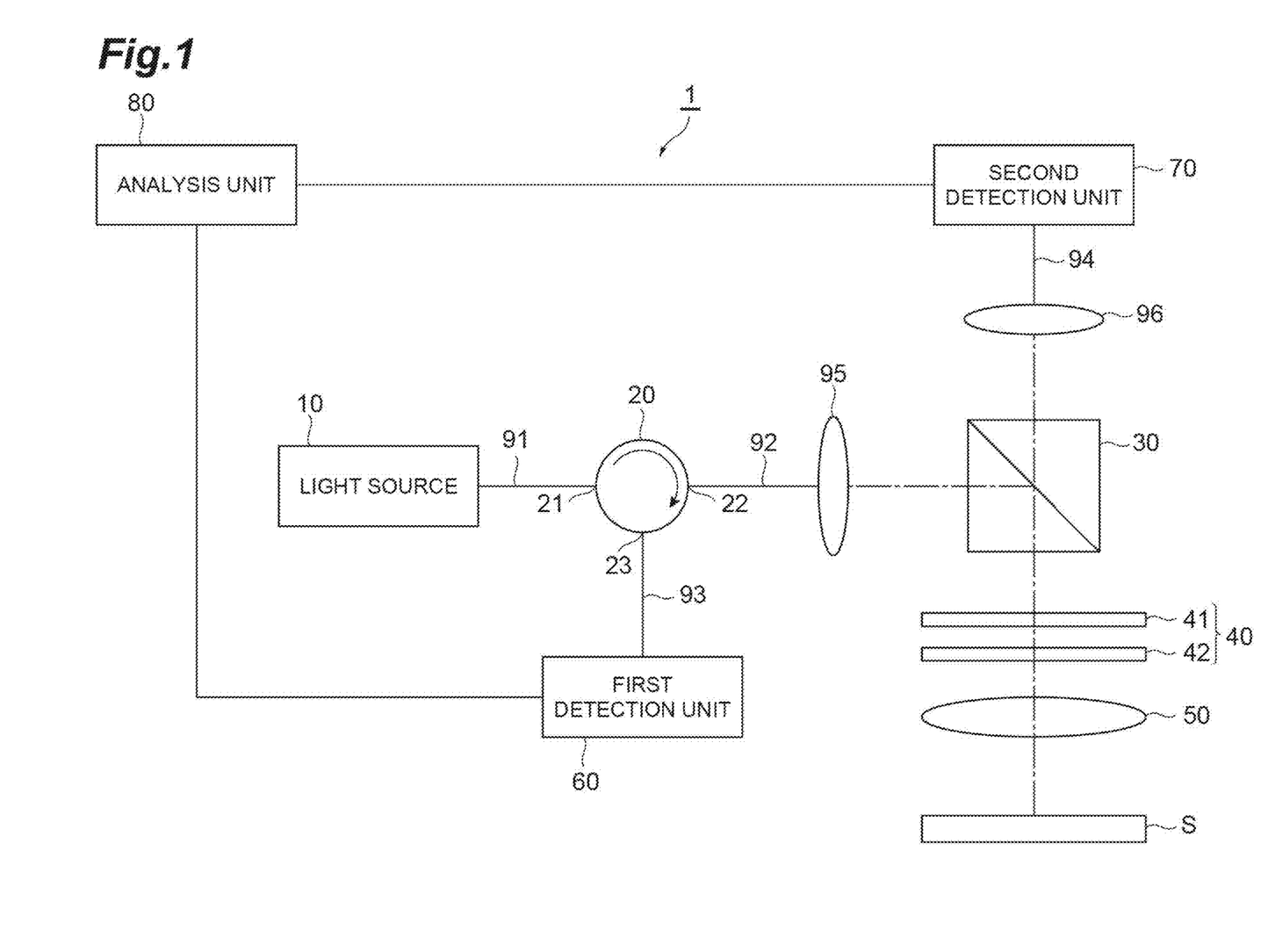
FIG. 1 is a diagram illustrating a configuration of an optical property evaluation apparatus 1.

FIG. 1 is a diagram illustrating a configuration of an optical property evaluation apparatus 1 according to an embodiment. The optical property evaluation apparatus 1 of the present embodiment is an apparatus for evaluating an optical property (reflectance, phase property) of an evaluation object S, and includes a light source 10, an optical circulator 20, a polarization beam splitter 30, a polarization adjustment unit (polarization adjuster) 40, an objective lens 50, a first detection unit (first detector) 60, a second detection unit (second detector) 70, and an analysis unit (analyzer) 80.

The light source 10 outputs light with which the evaluation object S is irradiated. The light source 10 may be a light source that outputs wide band light or a light source having a variable output wavelength.

The optical circulator 20 has a first port 21, a second port 22, and a third port 23. The first port 21 is optically coupled to the light source 10. The second port 22 is optically coupled to the polarization beam splitter 30. The third port 23 is optically coupled to the first detection unit 60.

The optical circulator 20 inputs the light reaching from the light source 10 to the first port 21, and outputs the light from the second port 22 to the polarization beam splitter 30. Further, the optical circulator 20 inputs the light reaching from the polarization beam splitter 30 to the second port 22, and outputs the light from the third port 23 to the first detection unit 60.

The polarization beam splitter 30 separates the light output from the light source 10 and reaching through the optical circulator 20 into a linearly polarized component (s-polarized component) in a first direction (first polarization direction) and a linearly polarized component (p-polarized component) in a second direction (second polarization direction), and outputs the linearly polarized component in the first direction (s-polarized component) to the polarization adjustment unit 40.

Further, the polarization beam splitter 30 separates the light reaching from the polarization adjustment unit 40 into the linearly polarized component (s-polarized component) in the first direction and the linearly polarized component (p-polarized component) in the second direction, and outputs the linearly polarized component in the first direction (s-polarized component) to the optical circulator 20 and the linearly polarized component in the second direction (p-polarized component) to the second detection unit 70.

The polarization adjustment unit 40 is provided on an optical path between the polarization beam splitter 30 and the evaluation object S. The polarization adjustment unit 40 adjusts a polarization state of the light output from the polarization beam splitter 30 as the s-polarized component, and irradiates the evaluation object S with the adjusted light. Further, the polarization adjustment unit 40 adjusts a polarization state of reflected light generated by the light irradiation on the evaluation object S, and outputs the adjusted light to the polarization beam splitter 30. The adjustment of the polarization state of the light by the polarization adjustment unit 40 includes a case where the polarization state is maintained without change. It is preferable that the polarization adjustment unit 40 causes the light to be vertically incident on the evaluation object S.

The polarization adjustment unit 40 may include a quarter wave plate 41 that inputs the light output from the polarization beam splitter 30 as the s-polarized component, and a half wave plate 42 that inputs the light output from the quarter wave plate. The direction of the optical axis of each of the quarter wave plate 41 and the half wave plate 42 is variable. The polarization state of the light passing through the quarter wave plate 41 and the half wave plate 42 can be adjusted by adjusting the direction of the optical axis of each of the quarter wave plate 41 and the half wave plate 42.

The objective lens 50 focuses and applies the light having the polarization state adjusted by the polarization adjustment unit 40 to the evaluation object S. Further, the objective lens 50 guides the reflected light generated by the light irradiation on the evaluation object S to the polarization adjustment unit 40.

The first detection unit 60 receives and detects the linearly polarized component in the first direction (s-polarized component), which is separated and output by the polarization beam splitter 30 from the light reaching the polarization beam splitter 30 from the evaluation object S through the polarization adjustment unit 40. The second detection unit 70 receives and detects the linearly polarized component in the second direction (p-polarized component), which is separated and output by the polarization beam splitter 30 from the light reaching the polarization beam splitter 30 from the evaluation object S through the polarization adjustment unit 40. When the light source 10 outputs the wide band light, each of the first detection unit 60 and the second detection unit 70 detects the intensity spectrum of the received light.

In the present embodiment, a first optical fiber 91 that guides the light output from the light source 10 to the first port 21 is provided between the light source 10 and the first port 21 of the optical circulator 20. Further, a second optical fiber 92 having one end optically coupled to the second port 22 of the optical circulator 20 is provided. The second optical fiber 92 is provided with a fiber collimator 95 at the other end, guides the light output from the second port 22, outputs the light from the fiber collimator 95 to the polarization beam splitter 30, and guides the light input to the fiber collimator 95 from the polarization beam splitter 30 to the second port 22.

In the present embodiment, a third optical fiber 93 that guides the light output from the third port 23 to the first detection unit 60 is provided between the third port 23 of the optical circulator 20 and the first detection unit 60. Further, a fourth optical fiber 94 having one end optically coupled to the second detection unit 70 is provided. The fourth optical fiber 94 is provided with a fiber collimator 96 at the other end, and guides the light input to the fiber collimator 96 from the polarization beam splitter 30 to the second detection unit 70. Further, the optical fibers 91 to 94 may not be provided if not necessary.

The analysis unit 80 analyzes the optical property (reflectance, phase property) of the evaluation object S based on the detection result by the first detection unit 60 or the second detection unit 70.

The analysis unit 80 may be a computer. The analysis unit 80 includes an input unit for inputting the detection result by the first detection unit 60 or the second detection unit 70, the analysis condition, and the like, a storage unit (hard disk drive, flash memory, RAM, ROM, or the like) for storing the detection result, the analysis condition, the analysis result, the analysis program, and the like, an operation unit (CPU, DSP, FPGA, or the like) for performing required analysis based on the detection result, and a display unit (for example, liquid crystal display, or the like) for displaying the analysis result and the like.

The analysis unit 80 obtains the reflectance when linearly polarized light in a specific direction is incident on the evaluation object S, based on the detection result by the first detection unit 60 when the light with which the evaluation object S is irradiated is set to be the linearly polarized light in the specific direction by the polarization adjustment unit 40.

The analysis unit 80 obtains the phase property at the reflection of the evaluation object S, based on the detection result by the first detection unit 60 or the second detection unit 70 when the light with which the evaluation object S is irradiated is set to have a polarization state different from that of the linearly polarized light in the specific direction by the polarization adjustment unit 40, and a Jones matrix representing an optical system until the light output from the polarization beam splitter 30 as the linearly polarized light in the first direction is reflected by the evaluation object S and returns to the polarization beam splitter 30.

A Jones vector $J_0$ of the light output from the polarization beam splitter 30 to the polarization adjustment unit 40 is represented by the following Formula (1). A Jones vector $J_1$ of the light reaching the polarization beam splitter 30 from the polarization adjustment unit 40 is represented by the following Formula (2).

$$J_0 = \begin{pmatrix} 0 \\ 1 \end{pmatrix} \quad (1)$$

$$J_1 = \begin{pmatrix} E_p \\ E_s \end{pmatrix} \quad (2)$$

When the optical axis of the quarter wave plate 41 is inclined at an angle $\alpha$ with respect to the polarization direction of the light output from the polarization beam splitter 30, a Jones matrix of the quarter wave plate 41 is represented by $J_{QWP1}$ of the following Formula (3) for the light traveling from the polarization beam splitter 30 to the evaluation object S, and represented by $J_{QWP2}$ of the following Formula (4) for the light traveling from the evaluation object S to the polarization beam splitter 30.

$$J_{QWP1} = \begin{pmatrix} \cos(-\alpha) & \sin(-\alpha) \\ -\sin(-\alpha) & \cos(-\alpha) \end{pmatrix} \begin{pmatrix} 1 & 0 \\ 0 & i \end{pmatrix} \begin{pmatrix} \cos\alpha & \sin\alpha \\ -\sin\alpha & \cos\alpha \end{pmatrix} \quad (3)$$

$$J_{QWP2} = \begin{pmatrix} \cos\alpha & \sin\alpha \\ -\sin\alpha & \cos\alpha \end{pmatrix} \begin{pmatrix} 1 & 0 \\ 0 & i \end{pmatrix} \begin{pmatrix} \cos(-\alpha) & \sin(-\alpha) \\ -\sin(-\alpha) & \cos(-\alpha) \end{pmatrix} \quad (4)$$

When the optical axis of the half wave plate 42 is inclined at an angle $\beta$ with respect to the polarization direction of the light output from the polarization beam splitter 30, a Jones matrix of the half wave plate 42 is represented by $J_{HWP1}$ of the following Formula (5) for the light traveling from the polarization beam splitter 30 to the evaluation object S, and represented by $J_{HWP2}$ of the following Formula (6) for the light traveling from the evaluation object S to the polarization beam splitter 30.

$$J_{HWP1} = \begin{pmatrix} \cos(-\beta) & \sin(-\beta) \\ -\sin(-\beta) & \cos(-\beta) \end{pmatrix} \begin{pmatrix} 1 & 0 \\ 0 & -1 \end{pmatrix} \begin{pmatrix} \cos\beta & \sin\beta \\ -\sin\beta & \cos\beta \end{pmatrix} \quad (5)$$

$$J_{HWP2} = \begin{pmatrix} \cos\beta & \sin\beta \\ -\sin\beta & \cos\beta \end{pmatrix} \begin{pmatrix} 1 & 0 \\ 0 & -1 \end{pmatrix} \begin{pmatrix} \cos(-\beta) & \sin(-\beta) \\ -\sin(-\beta) & \cos(-\beta) \end{pmatrix} \quad (6)$$

A Jones matrix $J_{sample}$ of the evaluation object S is represented by the following Formula (7). Using the Jones matrices described above, the Jones vector $J_1$ of the light reaching the polarization beam splitter 30 from the polarization adjustment unit 40 is represented by the following Formula (8). The detection value by the first detection unit 60 corresponds to the square of the absolute value of $E_s$ in the Jones vector $J_1$. The detection value by the second detection unit 70 corresponds to the square of the absolute value of $E_p$ in the Jones vector $J_1$.

$$J_{sample} = \begin{pmatrix} r_p & 0 \\ 0 & r_s \end{pmatrix} = \begin{pmatrix} |r_p|\exp(i\delta_p) & 0 \\ 0 & |r_s|\exp(i\delta_s) \end{pmatrix} \quad (7)$$

$$= \sqrt{|r_p|^2 + |r_s|^2} \exp(i\delta_p) \begin{pmatrix} \sin\chi & 0 \\ 0 & \cos\chi \cdot \exp(i\Delta) \end{pmatrix}$$

$$J_1 = J_{QWP2} J_{HWP2} J_{sample} J_{HWP1} J_{QWP1} J_0 \quad (8)$$

As shown in the Jones matrix $J_{sample}$ (Formula (7)) of the evaluation object S, for evaluating the optical property of the evaluation object S, the reflectance $|r_s|^2$ of the s-polarized light, the reflectance $|r_p|^2$ of the p-polarized light, and the relative reflection phase $\Delta = \delta_s - \delta_p$ between the reflection coefficient $r_s$ of the s-polarized light and the reflection coefficient $r_p$ of the p-polarized light may be obtained. In the optical property evaluation apparatus 1 and the optical property evaluation method of the present embodiment, $|r_s|^2$, $|r_p|^2$, and $\Delta$ are obtained as follows.

The reflectance $|r_s|^2$ of the s-polarized light can be obtained as follows. With respect to the polarization direction of the light (s-polarized light) output from the polarization beam splitter 30, the angle $\alpha$ of the optical axis of the quarter wave plate 41 is set to 0°, and the angle β of the optical axis of the half wave plate 42 is set to 0°. In this case, the light with which the evaluation object S is irradiated becomes only the s-polarized component by the polarization adjustment unit 40, and is reflected by the reflection coefficient $r_s$.

Figure 2:
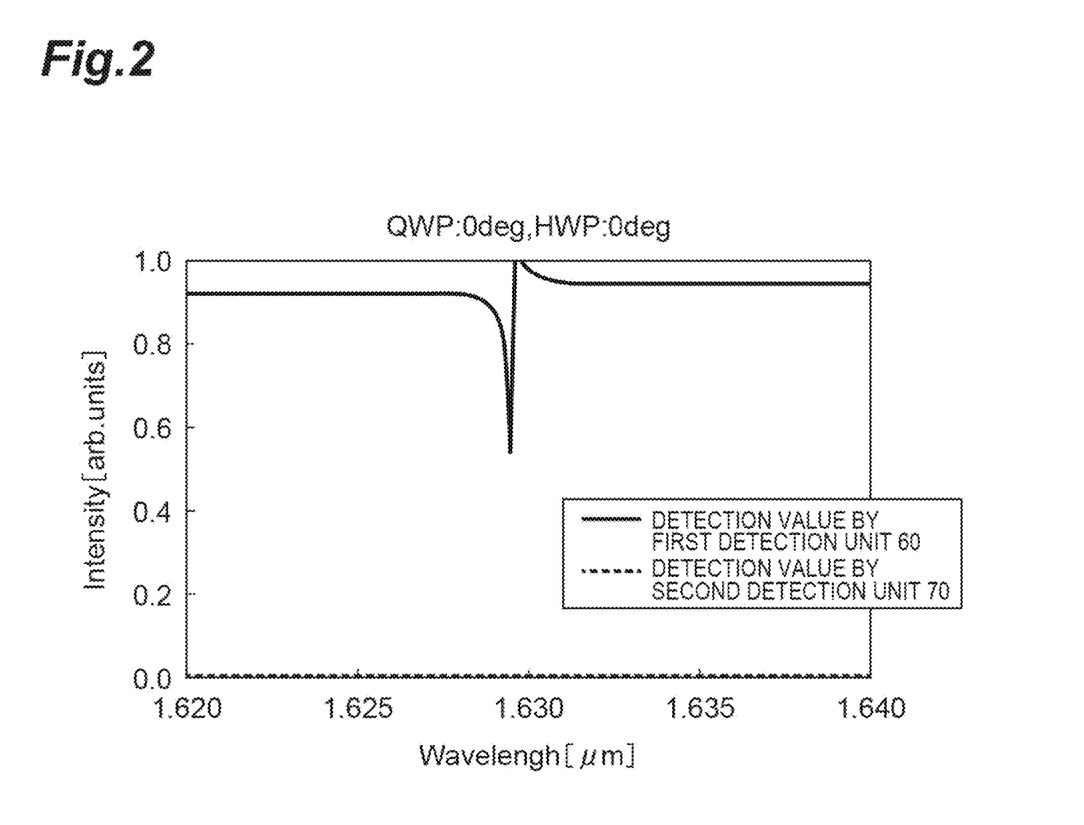
FIG. 2 is a graph showing an example of wavelength dependency of detection values by a first detection unit 60 and a second detection unit 70 when $\alpha=\beta=0°$.

The reflected light is also the s-polarized light when input to the polarization beam splitter 30, and thus, it is detected by the first detection unit 60 via the optical circulator 20. The detection value by the first detection unit 60 corresponds to $|E_s|^2=|r_s|^2$. FIG. 2 is a graph showing an example of wavelength dependency of the detection values by the first detection unit 60 and the second detection unit 70 when α=β=0°.

The reflectance $|r_p|^2$ of the p-polarized light can be obtained as follows. With respect to the polarization direction of the light (s-polarized light) output from the polarization beam splitter 30, the angle α of the optical axis of the quarter wave plate 41 is set to 0°, and the angle β of the optical axis of the half wave plate 42 is set to 45°. In this case, the light with which the evaluation object S is irradiated becomes only the p-polarized component by the polarization adjustment unit 40, and is reflected by the reflection coefficient $r_p$.

Figure 3:
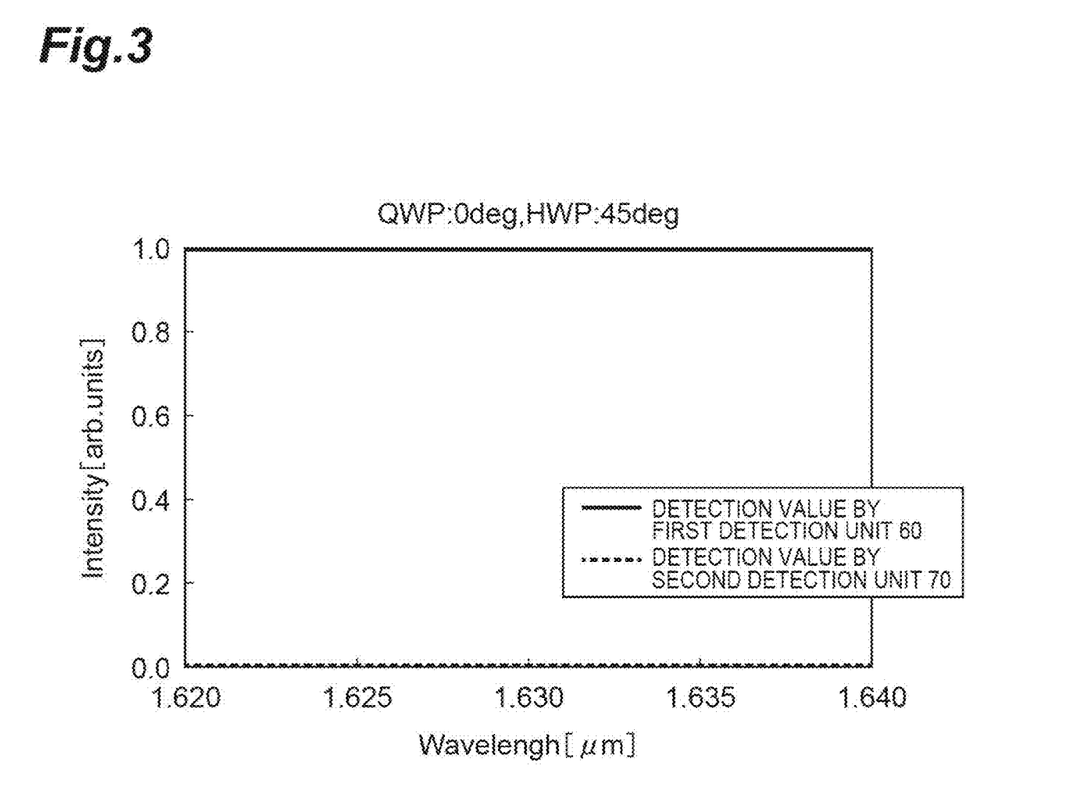
FIG. 3 is a graph showing an example of wavelength dependency of the detection values by the first detection unit 60 and the second detection unit 70 when $\alpha=0°$ and $\beta=45°$.

The reflected light is returned to the s-polarized light by the polarization adjustment unit 40 when input to the polarization beam splitter 30, and thus, it is detected by the first detection unit 60 via the optical circulator 20. The detection value by the first detection unit 60 corresponds to $|E_p|^2=|r_p|^2$. FIG. 3 is a graph showing an example of wavelength dependency of the detection values by the first detection unit 60 and the second detection unit 70 when α=0° and β=45°.

Figure 4:
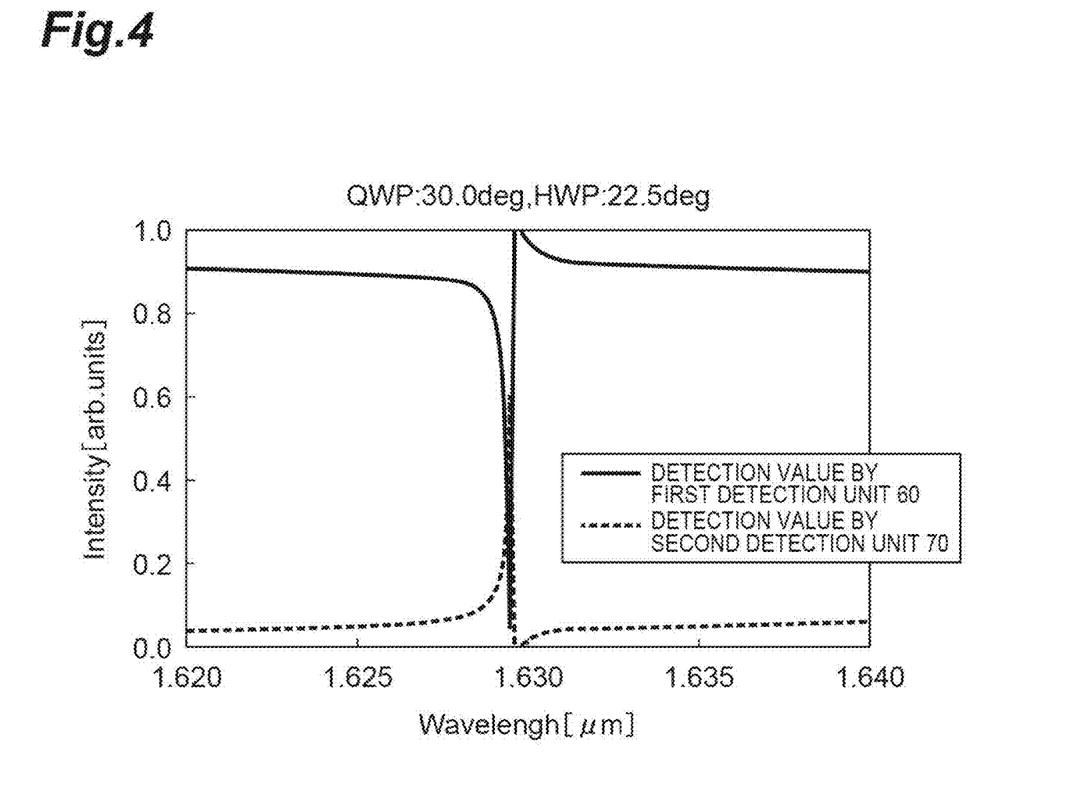
FIG. 4 is a graph showing an example of wavelength dependency of the detection values by the first detection unit 60 and the second detection unit 70 when $\alpha=30°$ and $\beta=22.5°$.

The relative reflection phase Δ can be obtained as follows. The angle α of the optical axis of the quarter wave plate 41 and the angle β of the optical axis of the half wave plate 42 are set to values different from the above set values so that the light with which the evaluation object S is irradiated has a polarization state different from that of both the s-polarized light and the p-polarized light. The detection value by the first detection unit 60 or the detection value by the second detection unit 70 in this case is obtained. FIG. 4 is a graph showing an example of wavelength dependency of the detection values by the first detection unit 60 and the second detection unit 70 when α=30° and β=22.5°.

The detection value by the first detection unit 60 should coincide with the calculation value $|E_s|^2$ obtained by the above Formula (7), and thus, Δ may be obtained such that the difference between the detection value by the first detection unit 60 and the calculation value $|E_s|^2$ obtained by the above Formula (7) is minimized. In this case, the least-squares method can be used. Further, an optimization algorithm such as a simulated annealing method, a simplex method, and a genetic algorithm may be used.

When the least-squares method is used, a value of the following Formula (9) is minimized. In this Formula, N is the number of wavelengths detected by the first detection unit 60, and n is a variable representing the wavelength. $y_n$ is the calculation value $|E_s|^2$ by the above Formula (7), $f(x_n)$ is the detection value by the first detection unit 60, and $\sigma_n$ is a standard deviation. Further, at the start of this calculation, an initial value of $y_n$ is set so that $y_n$ approaches $f(x_n)$ by performing the calculation. The initial value of $y_n$ may be a constant value regardless of the wavelength. That is, the initial value of Δ may be a constant value regardless of the wavelength.

$$\sum_{n=1}^{N}\left(\frac{y_n - f(x_n)}{\sigma_n}\right)^2 \quad (9)$$

Instead of obtaining Δ such that the difference between the detection value by the first detection unit 60 and the calculation value $|E_s|^2$ by the above Formula (7) is minimized, Δ such that the difference between the detection value by the second detection unit 70 and the calculation value $|E_p|^2$ by the above Formula (7) is minimized may be obtained. Further, both calculations may be performed for confirmation. Further, α and β may be set to other values to perform measurement, and calculation may be performed in the same manner.

Figure 5:
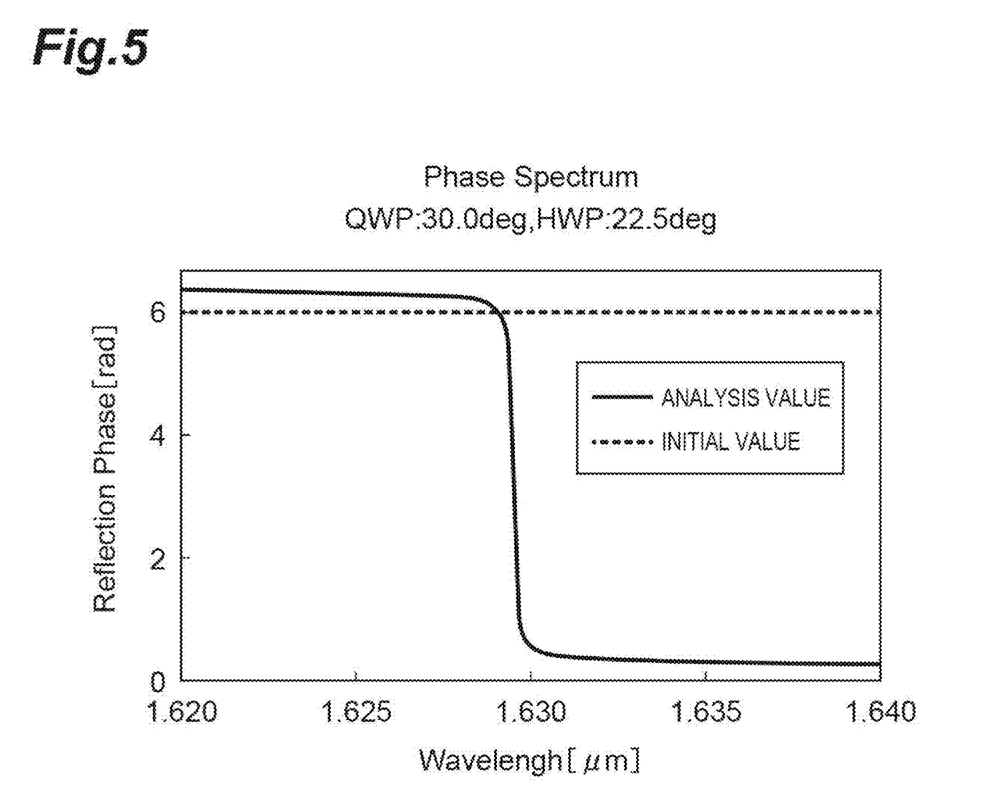
FIG. 5 is a graph showing an example of wavelength dependency of an initial value and an analysis value of a relative reflection phase $\Delta$.
Figure 6:
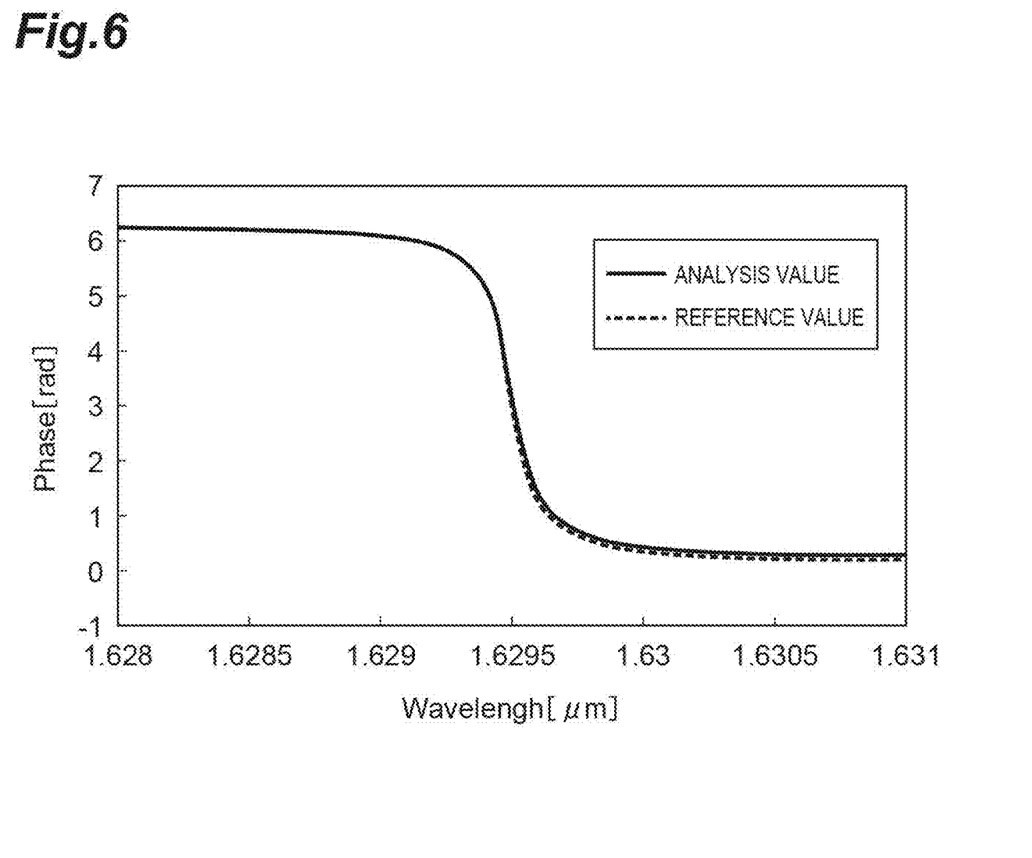
FIG. 6 is a graph showing wavelength dependency of the analysis value and a reference value of the relative reflection phase $\Delta$ in comparison.

FIG. 5 is a graph showing an example of wavelength dependency of an initial value and an analysis value of the relative reflection phase Δ. The initial phase spectrum is set to be constant at 6 radians regardless of the wavelength. FIG. 6 is a graph showing wavelength dependency of the analysis value and a reference value of the relative reflection phase Δ in comparison. The analysis value of Δ is the same as shown in FIG. 5. The reference value of Δ is measured by another method. Over a wide wavelength range, they are in good agreement with each other.

Figure 7:
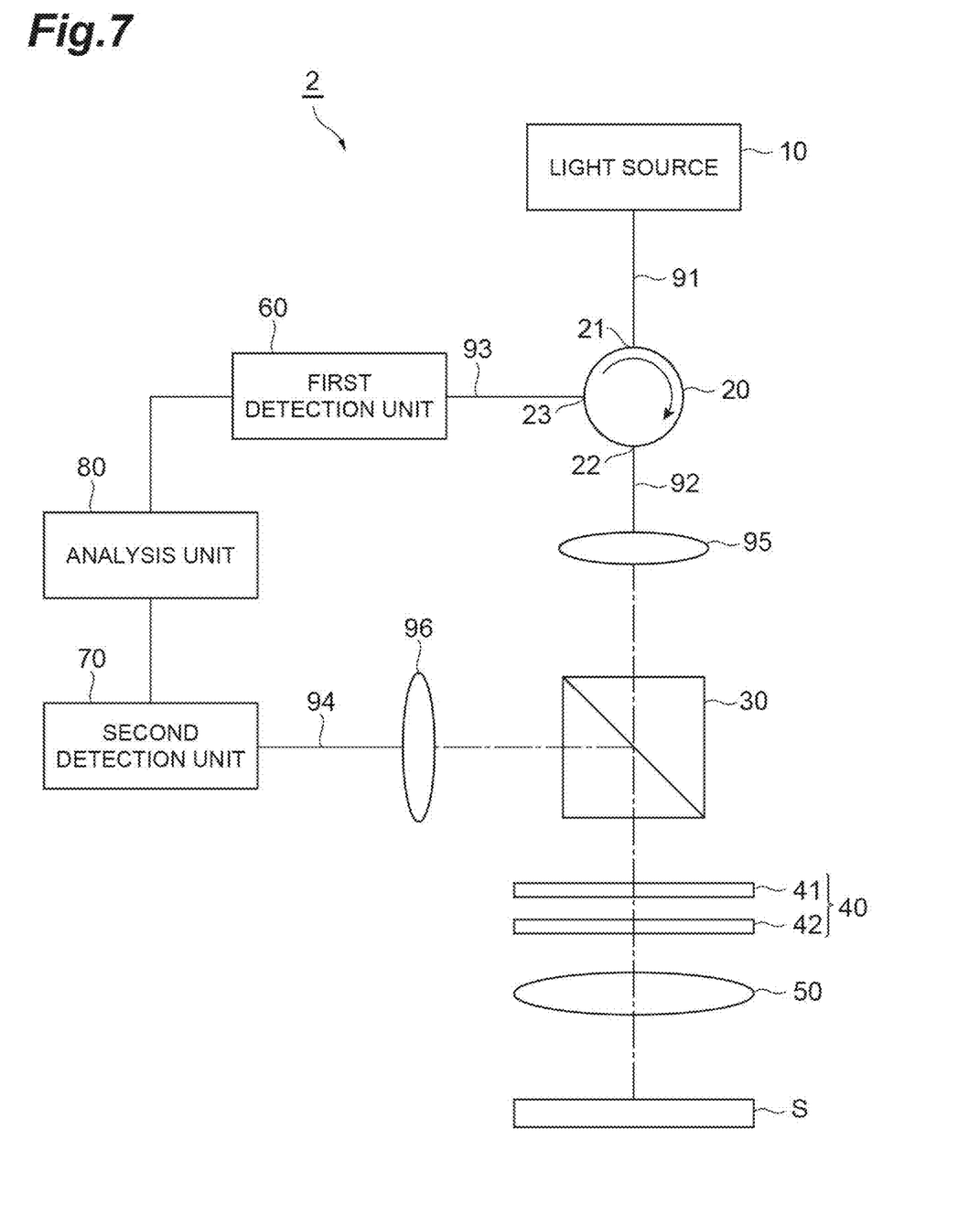
FIG. 7 is a diagram illustrating a configuration of an optical property evaluation apparatus 2.

FIG. 7 is a diagram illustrating a configuration of an optical property evaluation apparatus 2 as a modification of the above embodiment. In the optical property evaluation apparatus 1 illustrated in FIG. 1, the light output from the polarization beam splitter 30 to the evaluation object S is the s-polarized light, whereas in the optical property evaluation apparatus 2 illustrated in FIG. 7, the light output from the polarization beam splitter 30 to the evaluation object S is the p-polarized light.

That is, in the optical property evaluation apparatus 2 illustrated in FIG. 7, the polarization beam splitter 30 separates the light output from the light source 10 and reaching through the optical circulator 20 into the linearly polarized component (p-polarized component) in the first direction and the linearly polarized component (s-polarized component) in the second direction, and outputs the linearly polarized component in the first direction (p-polarized component) to the polarization adjustment unit 40.

Further, the polarization beam splitter 30 separates the light reaching from the polarization adjustment unit 40 into the linearly polarized component (p-polarized component) in the first direction and the linearly polarized component (s-polarized component) in the second direction, outputs the linearly polarized component in the first direction (p-polarized component) to the optical circulator 20, and outputs the linearly polarized component in the second direction (s-polarized component) to the second detection unit 70.

The first detection unit 60 receives and detects the linearly polarized component in the first direction (p-polarized component), which is separated and output by the polarization beam splitter 30 from the light reaching the polarization beam splitter 30 from the evaluation object S through the polarization adjustment unit 40. The second detection unit 70 receives and detects the linearly polarized component in the second direction (s-polarized component), which is separated and output by the polarization beam splitter 30 from the light reaching the polarization beam splitter 30 from the evaluation object S through the polarization adjustment unit 40.

The reflectance $|r_p|^2$ of the p-polarized light can be obtained as follows. With respect to the polarization direction of the light (p-polarized light) output from the polarization beam splitter 30, the angle α of the optical axis of the quarter wave plate 41 is set to 0°, and the angle β of the optical axis of the half wave plate 42 is set to 0°. In this case, the light with which the evaluation object S is irradiated becomes only the p-polarized component by the polarization adjustment unit 40, and is reflected by the reflection coefficient $r_p$.

The reflected light is also the p-polarized light when input to the polarization beam splitter 30, and thus, it is detected by the first detection unit 60 via the optical circulator 20. The detection value by the first detection unit 60 corresponds to $|E_p|^2=|r_p|^2$.

The reflectance $|r_s|^2$ of the s-polarized light can be obtained as follows. With respect to the polarization direction of the light (p-polarized light) output from the polarization beam splitter 30, the angle α of the optical axis of the quarter wave plate 41 is set to 0°, and the angle β of the optical axis of the half wave plate 42 is set to 45°. In this case, the light with which the evaluation object S is irradiated becomes only the s-polarized component by the polarization adjustment unit 40, and is reflected by the reflection coefficient $r_s$.

The reflected light is returned to the p-polarized light by the polarization adjustment unit 40 when input to the polarization beam splitter 30, and thus, it is detected by the first detection unit 60 via the optical circulator 20. The detection value by the first detection unit 60 corresponds to $|E_s|^2=|r_s|^2$.

The relative reflection phase Δ can be obtained as follows. The angle α of the optical axis of the quarter wave plate 41 and the angle β of the optical axis of the half wave plate 42 are set to values different from the above set values so that the light with which the evaluation object S is irradiated has a polarization state different from that of both the s-polarized light and the p-polarized light. The detection value by the first detection unit 60 or the detection value by the second detection unit 70 in this case is obtained. As described above, Δ can be obtained based on the detection value and the calculation value obtained by the above Formula (7).

As described above, according to the above embodiment, the optical property of the evaluation object can be easily evaluated by a simple configuration. In the above embodiment, since the light can be vertically incident on the evaluation object, the apparatus can be downsized to have a simple configuration.

In the technique described in Non Patent Document 1, it is necessary to replace the optical element to be inserted into the optical path for the reflectance measurement and the phase property measurement. On the other hand, in the above embodiment, since such replacement is not necessary, the load of the optical system adjustment is small, and the evaluation can be easily performed in a short time.

Further, in the above embodiment, by providing the optical fiber in a part of the optical path and using the optical circulator, it is possible to further reduce the size of the apparatus and facilitate the evaluation, and it is possible to perform the evaluation with excellent earthquake resistance.

The optical property evaluation apparatus and the optical property evaluation method are not limited to the embodiments and configuration examples described above, and various modifications are possible.

The optical property evaluation apparatus of the above embodiment includes (1) a light source for outputting light; (2) a polarization beam splitter for separating the light output from the light source into a linearly polarized component in a first direction and a linearly polarized component in a second direction; (3) a polarization adjustment unit (polarization adjuster) provided on an optical path between the polarization beam splitter and an evaluation object, and for adjusting a polarization state of the light output from the polarization beam splitter as the linearly polarized component in the first direction, irradiating the evaluation object with the adjusted light, adjusting a polarization state of reflected light generated by the light irradiation on the evaluation object, and outputting the adjusted light to the polarization beam splitter; (4) a first detection unit (first detector) for receiving and detecting the linearly polarized component in the first direction being separated and output by the polarization beam splitter from the light reaching the polarization beam splitter from the evaluation object through the polarization adjustment unit; (5) a second detection unit (second detector) for receiving and detecting the linearly polarized component in the second direction being separated and output by the polarization beam splitter from the light reaching the polarization beam splitter from the evaluation object through the polarization adjustment unit; and (6) an analysis unit (analyzer) for analyzing a reflectance and a phase property of the evaluation object based on the detection result by the first detection unit or the second detection unit.

In the above optical property evaluation apparatus, the polarization adjuster may include a quarter wave plate configured to input the light output from the polarization beam splitter as the linearly polarized component in the first direction, and a half wave plate configured to input the light output from the quarter wave plate.

In the above optical property evaluation apparatus, the analyzer may be configured to obtain the reflectance when linearly polarized light in a specific direction is incident on the evaluation object based on the detection result by the first detector when the light with which the evaluation object is irradiated is set to be the linearly polarized light in the specific direction by the polarization adjuster.

In the above optical property evaluation apparatus, the analyzer may be configured to obtain the phase property at the reflection of the evaluation object based on the detection result by the first detector or the second detector when the light with which the evaluation object is irradiated is set to have a polarization state different from the linearly polarized light in the specific direction by the polarization adjuster, and a Jones matrix representing an optical system until the light output from the polarization beam splitter as the linearly polarized light in the first direction is reflected by the evaluation object and returns to the polarization beam splitter.

In the above optical property evaluation apparatus, the light source may be configured to output wide band light. Further, the light source may have a variable output wavelength.

The above optical property evaluation apparatus may further include an optical circulator having a first port, a second port, and a third port, and configured to input the light output from the light source to the first port, output the light from the second port to the polarization beam splitter, input the light output from the polarization beam splitter to the second port, and output the light from the third port to the first detector.

The above optical property evaluation apparatus may further include (a) a first optical fiber provided between the light source and the first port of the optical circulator, and configured to guide the light output from the light source to the first port; (b) a second optical fiber having one end optically coupled to the second port of the optical circulator and a fiber collimator provided at the other end, and configured to guide the light output from the second port and output the light from the fiber collimator to the polarization beam splitter, and guide the light input to the fiber collimator from the polarization beam splitter to the second port; and (c) a third optical fiber provided between the third port of the optical circulator and the first detector, and configured to guide the light output from the third port to the first detector.

The above optical property evaluation apparatus may further include a fourth optical fiber having one end optically coupled to the second detector and a fiber collimator provided at the other end, and configured to guide the light input to the fiber collimator from the polarization beam splitter to the second detector.

In the above optical property evaluation apparatus, the polarization adjuster may be configured to cause the light to be vertically incident on the evaluation object.

The optical property evaluation method of the above embodiment includes (1) separating, by a polarization beam splitter, light output from a light source into a linearly polarized component in a first direction and a linearly polarized component in a second direction; (2) adjusting, by a polarization adjustment unit (polarization adjuster) provided on an optical path between the polarization beam splitter and an evaluation object, a polarization state of the light output from the polarization beam splitter as the linearly polarized component in the first direction, irradiating the evaluation object with the adjusted light, adjusting a polarization state of reflected light generated by the light irradiation on the evaluation object, and outputting the adjusted light to the polarization beam splitter; (3) receiving and detecting, by a first detection unit (first detector), the linearly polarized component in the first direction being separated and output by the polarization beam splitter from the light reaching the polarization beam splitter from the evaluation object through the polarization adjustment unit; (4) receiving and detecting, by a second detection unit (second detector), the linearly polarized component in the second direction being separated and output by the polarization beam splitter from the light reaching the polarization beam splitter from the evaluation object through the polarization adjustment unit; and (5) analyzing a reflectance and a phase property of the evaluation object based on the detection result by the first detection unit or the second detection unit.

In the above optical property evaluation method, the polarization adjuster may include a quarter wave plate configured to input the light output from the polarization beam splitter as the linearly polarized component in the first direction, and a half wave plate configured to input the light output from the quarter wave plate.

In the above optical property evaluation method, the reflectance when linearly polarized light in a specific direction is incident on the evaluation object may be obtained based on the detection result by the first detector when the light with which the evaluation object is irradiated is set to be the linearly polarized light in the specific direction by the polarization adjuster.

In the above optical property evaluation method, the phase property at the reflection of the evaluation object may be obtained based on the detection result by the first detector or the second detector when the light with which the evaluation object is irradiated is set to have a polarization state different from the linearly polarized light in the specific direction by the polarization adjuster, and a Jones matrix representing an optical system until the light output from the polarization beam splitter as the linearly polarized light in the first direction is reflected by the evaluation object and returns to the polarization beam splitter.

In the above optical property evaluation method, the light source may be configured to output wide band light. Further, the light source may have a variable output wavelength.

The above optical property evaluation method may further include inputting, by an optical circulator having a first port, a second port, and a third port, the light output from the light source to the first port, outputting the light from the second port to the polarization beam splitter, inputting the light output from the polarization beam splitter to the second port, and outputting the light from the third port to the first detector.

The above optical property evaluation method may further include (a) guiding, by a first optical fiber provided between the light source and the first port of the optical circulator, the light output from the light source to the first port; (b) guiding, by a second optical fiber having one end optically coupled to the second port of the optical circulator and a fiber collimator provided at the other end, the light output from the second port and outputting the light from the fiber collimator to the polarization beam splitter, and guiding the light input to the fiber collimator from the polarization beam splitter to the second port; and (c) guiding, by a third optical fiber provided between the third port of the optical circulator and the first detector, the light output from the third port to the first detector.

The above optical property evaluation method may further include guiding, by a fourth optical fiber having one end optically coupled to the second detector and a fiber collimator provided at the other end, the light input to the fiber collimator from the polarization beam splitter to the second detector.

In the above optical property evaluation method, the polarization adjuster may be configured to cause the light to be vertically incident on the evaluation object.

The embodiments can be used as an apparatus and a method that can easily evaluate an optical property of an evaluation object by a simple configuration.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical property evaluation apparatus comprising:
a light source configured to output light; a polarization beam splitter configured to separate the light output from the light source into a linearly polarized component in a first direction and a linearly polarized component in a second direction; a polarization adjuster provided on an optical path between the polarization beam splitter and an evaluation object, and configured to adjust a polarization state of the light output from the polarization beam splitter as the linearly polarized component in the first direction, irradiate the evaluation object with an adjusted light, adjust a polarization state of reflected light generated by the light irradiation on the evaluation object, and output the adjusted light to the polarization beam splitter; a first detector configured to receive and detect the linearly polarized component in the first direction being separated and output by the polarization beam splitter from the light reaching the polarization beam splitter from the evaluation object through the polarization adjuster; a second detector configured to receive and detect the linearly polarized component in the second direction being separated and output by the polarization beam splitter from the light reaching the polarization beam splitter from the evaluation object through the polarization adjuster; and an analyzer configured to analyze a reflectance and a phase property of the evaluation object based on the detection result by the first detector or the second detector.

2. The optical property evaluation apparatus according to claim 1, wherein the polarization adjuster includes a quarter wave plate configured to input the light output from the polarization beam splitter as the linearly polarized component in the first direction, and a half wave plate configured to input the light output from the quarter wave plate.

3. The optical property evaluation apparatus according to claim 1, wherein the analyzer is configured to obtain the reflectance when linearly polarized light in a specific direction is incident on the evaluation object based on the detection result by the first detector when the light with which the evaluation object is irradiated is set to be the linearly polarized light in the specific direction by the polarization adjuster.

4. The optical property evaluation apparatus according to claim 3, wherein the analyzer is configured to obtain the phase property at the reflection of the evaluation object based on the detection result by the first detector or the second detector when the light with which the evaluation object is irradiated is set to have a polarization state different from the linearly polarized light in the specific direction by the polarization adjuster, and a Jones matrix representing an optical system until the light output from the polarization beam splitter as the linearly polarized light in the first direction is reflected by the evaluation object and returns to the polarization beam splitter.

5. The optical property evaluation apparatus according to claim 1, wherein the light source is configured to output wide band light.

6. The optical property evaluation apparatus according to claim 1, wherein the light source has a variable output wavelength.

7. The optical property evaluation apparatus according to claim 1, further comprising an optical circulator having a first port, a second port, and a third port, and configured to input the light output from the light source to the first port, output the light from the second port to the polarization beam splitter, input the light output from the polarization beam splitter to the second port, and output the light from the third port to the first detector.

8. The optical property evaluation apparatus according to claim 7, further comprising:
a first optical fiber provided between the light source and the first port of the optical circulator, and configured to guide the light output from the light source to the first port;
a second optical fiber having one end optically coupled to the second port of the optical circulator and a fiber collimator provided at the other end, and configured to guide the light output from the second port and output the light from the fiber collimator to the polarization beam splitter, and guide the light input to the fiber collimator from the polarization beam splitter to the second port; and
a third optical fiber provided between the third port of the optical circulator and the first detector, and configured to guide the light output from the third port to the first detector.

9. The optical property evaluation apparatus according to claim 1, further comprising a fourth optical fiber having one end optically coupled to the second detector and a fiber collimator provided at the other end, and configured to guide the light input to the fiber collimator from the polarization beam splitter to the second detector.

10. The optical property evaluation apparatus according to claim 1, wherein the polarization adjuster is configured to cause the light to be vertically incident on the evaluation object.

11. An optical property evaluation method comprising:
separating, by a polarization beam splitter, light output from a light source into a linearly polarized component in a first direction and a linearly polarized component in a second direction; adjusting, by a polarization adjuster provided on an optical path between the polarization beam splitter and an evaluation object, a polarization state of the light output from the polarization beam splitter as the linearly polarized component in the first direction, irradiating the evaluation object with an adjusted light, adjusting a polarization state of reflected light generated by the light irradiation on the evaluation object, and outputting the adjusted light to the polarization beam splitter; receiving and detecting, by a first detector, the linearly polarized component in the first direction being separated and output by the polarization beam splitter from the light reaching the polarization beam splitter from the evaluation object through the polarization adjuster; receiving and detecting, by a second detector, the linearly polarized component in the second direction being separated and output by the polarization beam splitter from the light reaching the polarization beam splitter from the evaluation object through the polarization adjuster; and analyzing a reflectance and a phase property of the evaluation object based on the detection result by the first detector or the second detector.

12. The optical property evaluation method according to claim 11, wherein the polarization adjuster includes a quarter wave plate configured to input the light output from the polarization beam splitter as the linearly polarized component in the first direction, and a half wave plate configured to input the light output from the quarter wave plate.

13. The optical property evaluation method according to claim 11, wherein the reflectance when linearly polarized light in a specific direction is incident on the evaluation object is obtained based on the detection result by the first detector when the light with which the evaluation object is irradiated is set to be the linearly polarized light in the specific direction by the polarization adjuster.

14. The optical property evaluation method according to claim 13, wherein the phase property at the reflection of the evaluation object is obtained based on the detection result by the first detector or the second detector when the light with which the evaluation object is irradiated is set to have a polarization state different from the linearly polarized light in the specific direction by the polarization adjuster, and a Jones matrix representing an optical system until the light output from the polarization beam splitter as the linearly polarized light in the first direction is reflected by the evaluation object and returns to the polarization beam splitter.

15. The optical property evaluation method according to claim 11, wherein the light source is configured to output wide band light.

16. The optical property evaluation method according to claim 11, wherein the light source has a variable output wavelength.

17. The optical property evaluation method according to claim 11, further comprising inputting, by an optical circulator having a first port, a second port, and a third port, the light output from the light source to the first port, outputting the light from the second port to the polarization beam splitter, inputting the light output from the polarization beam splitter to the second port, and outputting the light from the third port to the first detector.

18. The optical property evaluation method according to claim 17, further comprising:
  guiding, by a first optical fiber provided between the light source and the first port of the optical circulator, the light output from the light source to the first port;
  guiding, by a second optical fiber having one end optically coupled to the second port of the optical circulator and a fiber collimator provided at the other end, the light output from the second port and outputting the light from the fiber collimator to the polarization beam splitter, and guiding the light input to the fiber collimator from the polarization beam splitter to the second port; and
  guiding, by a third optical fiber provided between the third port of the optical circulator and the first detector, the light output from the third port to the first detector.

19. The optical property evaluation method according to claim 11, further comprising guiding, by a fourth optical fiber having one end optically coupled to the second detector and a fiber collimator provided at the other end, the light input to the fiber collimator from the polarization beam splitter to the second detector.

20. The optical property evaluation method according to claim 11, wherein the polarization adjuster is configured to cause the light to be vertically incident on the evaluation object.

* * * * *